United States Patent
Hisa

(10) Patent No.: US 8,395,683 B2
(45) Date of Patent: Mar. 12, 2013

(54) IMAGING APPARATUS HAVING A CYCLIC NOISE REDUCTION UNIT AND CONTROL METHOD THEREOF

(75) Inventor: Kenzo Hisa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 12/821,058

(22) Filed: Jun. 22, 2010

(65) Prior Publication Data

US 2011/0001852 A1 Jan. 6, 2011

(30) Foreign Application Priority Data

Jul. 1, 2009 (JP) ................................. 2009-157025

(51) Int. Cl.
*H04N 5/217* (2011.01)
*G06K 9/40* (2006.01)
(52) U.S. Cl. ...................................... 348/241; 382/260
(58) Field of Classification Search .......... 348/241–243; 382/260, 261, 262, 264, 265
See application file for complete search history.

(56) References Cited

U.S. PATENT DOCUMENTS

| 5,367,343 A | 11/1994 | Blair |
| 5,508,751 A | 4/1996 | Nitta |
| 6,982,755 B1 | 1/2006 | Kikuzawa |
| 2007/0248332 A1* | 10/2007 | Yata et al. .................... 386/113 |

FOREIGN PATENT DOCUMENTS

| JP | 7-162718 A | 6/1995 |
| JP | 2000-278592 A | 10/2000 |
| JP | 2005-073233 A | 3/2005 |

* cited by examiner

*Primary Examiner* — Timothy J Henn
(74) *Attorney, Agent, or Firm* — Canon USA, Inc., IP Division

(57) ABSTRACT

An imaging apparatus includes, an imaging unit configured to output an image signal of a captured object, a processing unit configured to perform a signal processing on the image signal, wherein the processing unit includes a cyclic noise reduction unit configured to reduce a noise of the image signal, a parameter change unit configured to change a parameter concerning at least one of an imaging by the imaging unit and the signal processing, and a coefficient change unit configured to change a cyclic coefficient of the cyclic noise reduction unit.

16 Claims, 5 Drawing Sheets

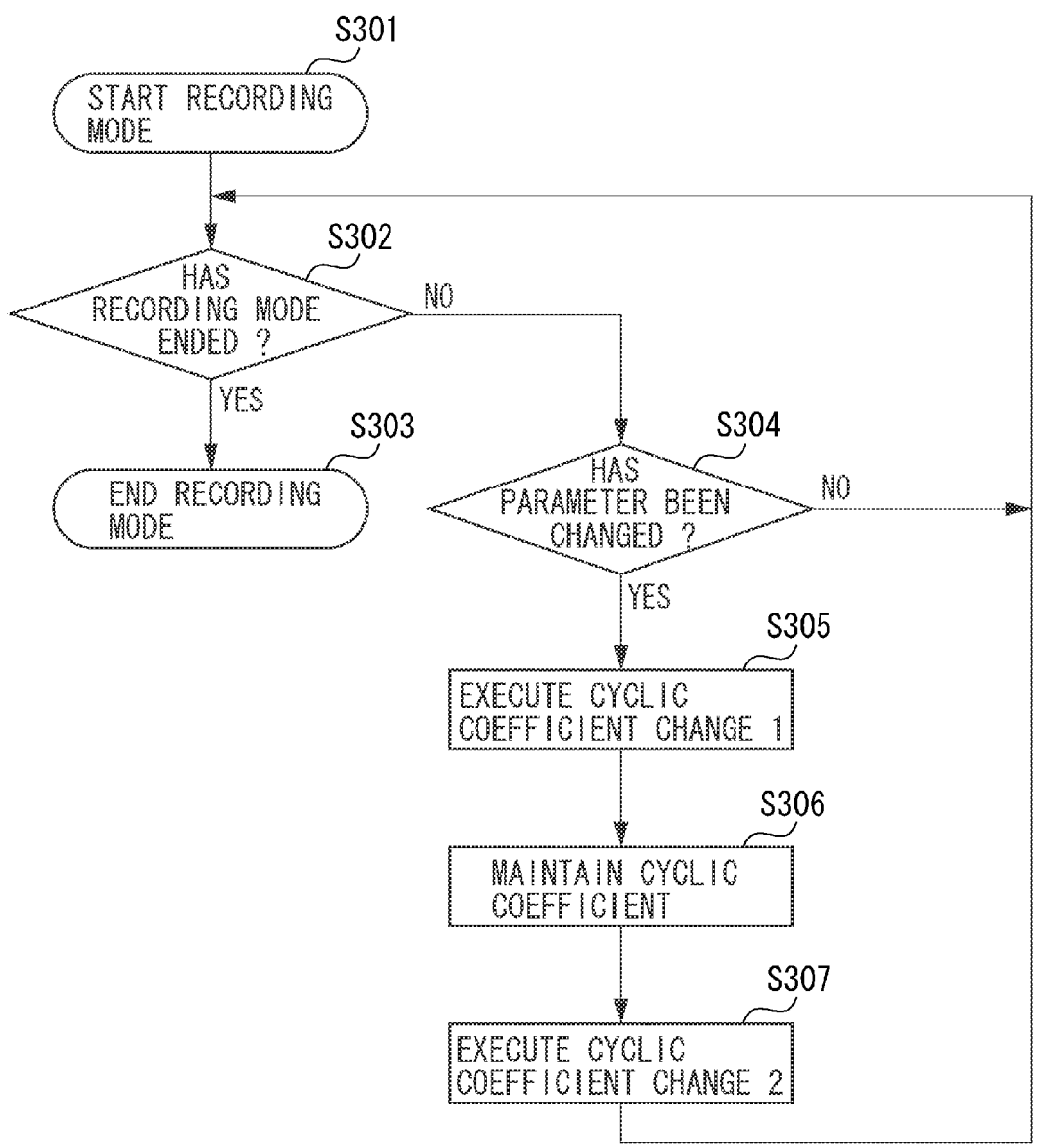

FIG. 4A

|  | | State of setting parameters after change | | | |
|---|---|---|---|---|---|
|  | | $M_1$ | $M_2$ | $M_3$ | $M_4$ |
| State of setting parameters before change | $M_1$ |  | $K_{12}$ | $K_{13}$ | $K_{14}$ |
| | $M_2$ | $K_{21}$ |  | $K_{23}$ | $K_{24}$ |
| | $M_3$ | $K_{31}$ | $K_{32}$ |  | $K_{34}$ |
| | $M_4$ | $K_{41}$ | $K_{42}$ | $K_{43}$ |  |

FIG. 4B

| K | $F_{23}$ |
|---|---|
| 0 | 0 |
| 0.1 | 1 |
| 0.2 | 2 |
| 0.3 | 3 |
| 0.4 | 4 |
| 0.5 | 5 |
| 0.6 | 7 |
| 0.7 | 10 |
| 0.8 | 17 |
| 0.9 | 37 |

IMAGING APPARATUS HAVING A CYCLIC NOISE REDUCTION UNIT AND CONTROL METHOD THEREOF

BACKGROUND OF THE INVENTION

1. Field of the Invention

The present invention relates to an imaging apparatus including a cyclic noise reduction circuit.

2. Description of the Related Art

A cyclic noise reduction circuit is a circuit for reducing noise of a moving image signal of a digital video camera or the like. This circuit uses a signal of the same pixel obtained for each frame to reduce the noise.

When a cyclic coefficient of the cyclic noise reduction circuit is determined, it is necessary to be determined in consideration of both a noise component and the amount of tailing of a signal in the previous frame. In Japanese Patent Application Laid-Open No. 2000-278592, a method is discussed in which a cyclic coefficient is changed corresponding to zooming, thereby reducing tailing during zooming. Further, in Japanese Patent Application Laid-Open No. 7-162718, a method is discussed in which movement of an object is detected in order to change a cyclic coefficient in an area where movement is present, thereby reducing tailing.

When various types of parameters concerning an imaging by an imaging system or a signal processing by a signal processing system are changed, such as a change of angle of view by zooming and a change of contrast, a signal to be input to a noise reduction circuit may be changed, and a cyclic coefficient suitable for the state after the change may be changed from that before the change. At this time, if the cyclic coefficient suitable for the state after the change of parameter is simply set and changed, an image effect that causes discomfort for a user may occur when the parameter is changed.

For example, when the change of parameter is executed in the signal processing system and a color is changed, the color may be rapidly changed or gradually changed depending on a cyclic coefficient after the change. Further, when the parameter change is executed in the imaging system and an angle of view is changed by magnifying an image to be output, the image may be changed to an image rapidly or gradually follows the change in angle of view depending on a cyclic coefficient after the change.

A difference in change of image when a parameter is changed by these cyclic coefficients may result in an uncomfortable image effect according to a use environment or a request of a user. When the user does not intend to output an unnatural image to the eye on a display screen, such as a live view, it may be undesired that the color or the angle of view is rapidly changed by the cyclic coefficient after the change.

On the contrary, for example, when the user intends to confirm an effect on an image by the change of various types of parameters in succession, it may be undesired that the image is gradually changed by the cyclic coefficient after the change.

SUMMARY OF THE INVENTION

According to an aspect of the present invention, an imaging apparatus includes an imaging unit configured to capture an object to output an image signal of the captured object, and includes a processing unit configured to perform a signal processing on the image signal. The processing unit includes a cyclic noise reduction unit configured to reduce a noise of the image signal. The imaging apparatus also includes a parameter change unit configured to change a parameter concerning the imaging unit or the processing unit, and includes a coefficient change unit configured to change a cyclic coefficient of the cyclic noise reduction unit. When the parameter change unit changes the parameter, the coefficient change unit both changes the cyclic coefficient from a first cyclic coefficient corresponding to a state before the change of parameter to a second cyclic coefficient, and changes the cyclic coefficient from the second cyclic coefficient to a third cyclic coefficient corresponding to a state after the change of the parameter.

According to the present invention, an imaging apparatus controls a cyclic coefficient of a noise reduction circuit, when a parameter is changed, to control a change in output signal. As a result, the discomfort of a user resulting from the image conversion corresponding to the change of parameter when the parameter is changed is reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating a change of cyclic coefficient according to the first exemplary embodiment.

FIGS. 4A and 4B illustrate data tables concerning a second cyclic coefficient.

DESCRIPTION OF THE EMBODIMENTS

Various exemplary embodiments, features, and aspects of the invention will be described in detail below with reference to the drawings.

Figure 1:
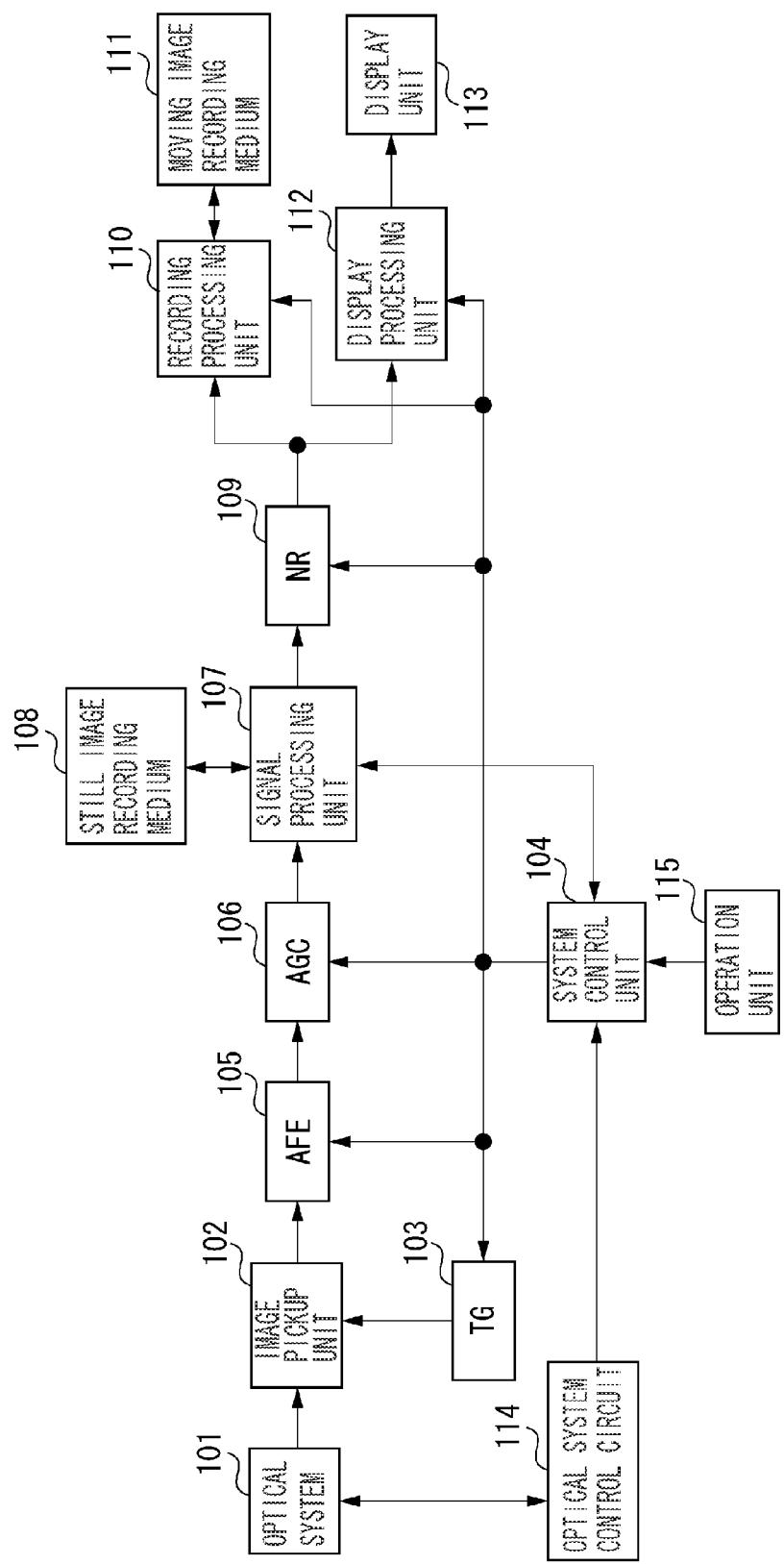
FIG. 1 is a block diagram illustrating a schematic configuration of a digital video camera according to a first exemplary embodiment.

FIG. 1 illustrates a schematic configuration of a digital video camera according to a first exemplary embodiment. An image pickup unit 102 including a complementary metal oxide semiconductor (CMOS) sensor, a charge coupled device (CCD) sensor, or the like subjects light passing through an optical system 101 such as a diaphragm and a lens to photoelectric conversion. An object is captured at a shutter speed and a frame rate determined by a system control unit 104, which is controlled by a timing generator (hereinafter, TG) 103, including a central processing unit (CPU), a memory, and the like. A signal subjected to photoelectric conversion by the image pickup unit 102 is output from the image pickup unit 102.

The signal output from the image pickup unit 102 is subjected to analog-to-digital (A/D) conversion by an analog frontend (hereinafter, AFE) 105. Thereafter, the signal is amplified with a value determined by the system control unit 104 under automatic gain control (hereinafter, AGC) 106, and transmitted to a camera signal processing unit 107 (hereinafter, referred to as signal processing unit).

In the present exemplary embodiment, an imaging unit includes the optical system 101, an optical system control circuit 114, the image pickup unit 102, the TG 103, the system control unit 104, the AFE 105, and the AGC 106. In the signal processing unit 107 (processing unit), image signal processing such as gamma correction, contour correction, color gain correction, or a change of cutting size or magnification ratio is executed. After signal processing such as compression for a still image is executed, the signal is transmitted to a still image recording medium 108 and the still image is recorded.

A moving image video is transmitted to a noise reduction (hereinafter, NR) unit 109 and noise is reduced. An output signal of the NR unit 109 is transmitted to a recording processing unit 110. A signal subjected to signal processing and converted to a format for recording a moving image by the recording processing unit 110 (recording processing unit) is transmitted to a moving image recording medium 111 such as a memory card or a digital versatile disc (DVD), and the moving image is recorded.

Further, the signal is also transmitted from the NR unit 109 to a display processing unit 112, converted into a signal for display, and then displayed on a display unit 113 such as liquid crystal display (LCD).

The system control unit 104 acquires information concerning a state of the optical system 101 such as a diaphragm position and a zoom position from the optical system control circuit 114, information operated by a user from an operation unit 115 (instruction unit), color information including luminance information transmitted from the signal processing unit 107, and the like.

Then, based on these pieces of information, the system control unit 104 executes control of the optical system 101, the TG 103, the AFE 105, the AGC 106, the signal processing unit 107, the NR circuit 109, and the recording processing unit 110. In addition, the system control unit 104 executes setting and changing of parameters. The operation unit 115 can execute, in addition to a setting of white balance, exposure, and zooming, various instructions such as start and end of recording of a moving image by the operation of a user (recording instruction unit).

In the present exemplary embodiment, when a user instructs a change of parameter by the operation unit 115, the system control unit 104 determines a suitable cyclic coefficient and sets it to the NR unit 109. The parameters include various types of parameters of arrangement of the optical system (zooming, etc.), various parameters for the imaging unit, and various parameters for the processing unit.

The parameter may be changed automatically by an instruction of the operation unit 115. For example, when white balance is automatically set, in a case in which an object to be captured is changed or a composition is changed even if the object to be captured is the same, a gain value multiplying an image signal to be processed by the signal processing unit 107 is changed by the system control unit 104.

Further, for example, a case in which a setting of manual white balance is changed, a case in which a setting is changed from the setting suitable for capturing scenery to the setting suitable for capturing a person, and the like are included in a change of parameter. Furthermore, for example, when a function such as pixel addition and frame addition is applied changing from the normal image capture condition, as characteristics of the function itself, it is hardly affected by noise. Thus, a cyclic coefficient may frequently be changed. Such a case is also referred to as a change of parameter.

In the present exemplary embodiment, in order to prevent an uncomfortable image from being generated when a parameter is changed, a change in output signal is controlled when the parameter is changed. Specifically, a cyclic coefficient in the above-described noise reduction circuit is changed, thereby reducing an influence on an image by the change of parameter.

Figure 2A:
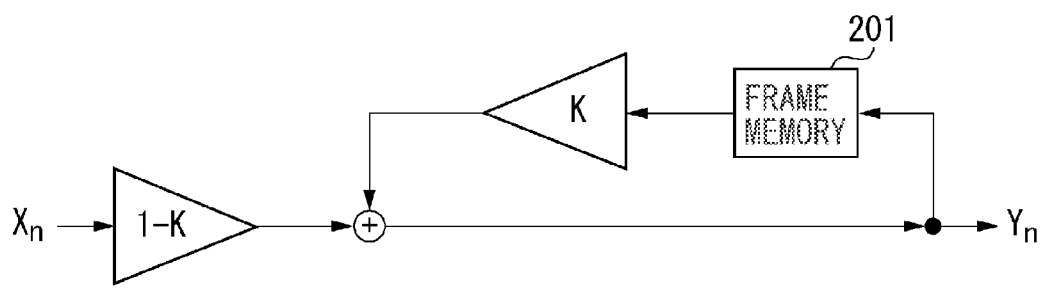
FIG. 2A is a block diagram illustrating a cyclic noise reduction circuit and FIG. 2B is a graph illustrating a change in luminance output for a frame.

An operation of a cyclic NR circuit to be used in the present exemplary embodiment will be described. FIG. 2A illustrates an NR circuit.

$X_n$, is an input signal to the NR circuit of n-th frame. $Y_n$, is an output signal. A signal input to the cyclic NR circuit is multiplied by $(1-K)$ times to output $(1-K)X_n$. K is a cyclic coefficient and is a value between 0 and 1. An output signal $Y_{n-1}$ is output from a frame memory 201 before one frame is stored in the frame memory 201. $Y_{n-1}$ is multiplied by K times and added to $(1-K)X_n$. This added signal is the output $Y_n$. In other words, the signal output is given by equation (1).

$$Y_n = (1-K)X_n + KY_{n-1} \tag{1}$$

In a case where the cyclic coefficient is brought close to 0, a ratio of the input signal is increased, the output signal is close to the input signal, and the effect of reducing a noise is reduced. Conversely, in a case where the cyclic coefficient is brought close to 1, a ratio of the output signal in the previous frame is increased. A random noise N' of the output signal is given by equation (2):

$$N' = \sqrt{\frac{1-K}{1+K}} \times N \tag{2}$$

where N is a random noise of an NR signal.
The larger the K becomes, the smaller the N' of the noise becomes.

However, tailing occurs if a signal is passed through this noise reduction circuit when the signal is actually fluctuated, such as when an object moves, and when panning and tilting are executed, since it is affected by the signal of the previous frame. For example, assuming that a signal which is continuously $S_1$ becomes $S_2$ at n=1, an n-th output signal is given by equation (3).

$$Y_n = K^n S_1 + (1-K^n)S_2 \tag{3}$$

Figure 2B:
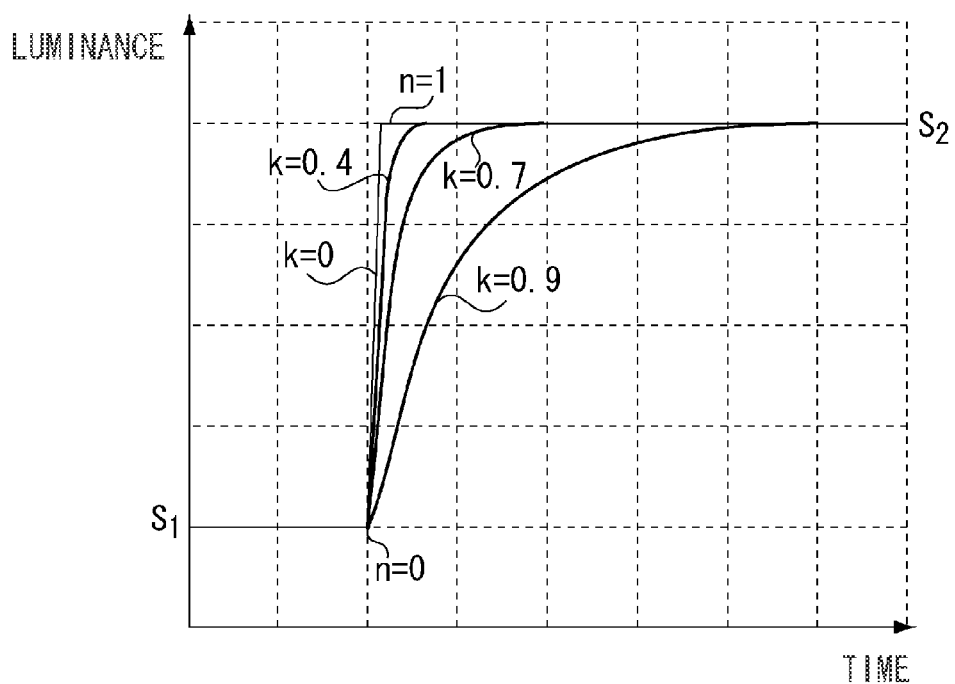

FIG. 2B illustrates a change in output signal corresponding to each frame. The horizontal axis represents time and corresponds to a frame number. The vertical axis indicates luminance of a signal. FIG. 2B illustrates an example in a case where K is 0, 0.4, 0.7, and 0.9. Obviously in FIG. 2B, several frames are needed to change from a signal of $S_1$ to a signal of $S_2$. As the cyclic coefficient K is increased, the amount of time needed to reach the output signal $S_2$ is increased. A change of output is gradually applied to the output signal.

FIG. 3 illustrates the flow of a change of the cyclic coefficient in the present exemplary embodiment. System control unit 104 performs steps described below. In step S301, a recording mode is started by starting up a power source, and setting and changing a mode. The recording mode is a wait state capable of starting recording of a moving image at any time with a recording start instruction by a recording start button or the like.

Next, in step S302, it is determined whether the recording mode ends. If the power source is turned off, or the recording mode is changed to a playback mode, which can execute image playback (YES in step S302), in step S303, the recording wait state ends.

In step S304, in the recording mode, it is determined that whether a change of parameter is instructed the operation unit 115 receiving the operation of a user. When the change of parameter is absent (NO in step S304), the determination in steps S302 and S304 are repeated. At timing that the change of parameter is executed (YES in step S304), then, in step S305, a cyclic coefficient is changed from a first cyclic coefficient to a second cyclic coefficient (cyclic coefficient change 1).

The second cyclic coefficient is determined in advance according to the type of parameters to be changed, a parameter before the change, and a parameter after the change. Next, in step 306, the processing waits a predetermined time interval before executing a change to a third cyclic coefficient. In step S307, at that the end of the predetermined time interval, a cyclic coefficient is changed from the second cyclic coefficient to the third cyclic coefficient (cyclic coefficient change 2).

In step S306, the time interval is determined in advance according to a value of the second cyclic coefficient, and the processing waits for that timing to come. If the change of cyclic coefficient ends in step S307, the processing returns to determination in step S302.

The first cyclic coefficient and the third cyclic coefficient are determined so as to suppress both of the noise and tailing to be well-balanced in consideration thereof according to a state of setting of the respective parameters. Accordingly, there is also a case in which a cyclic coefficient is the same cyclic coefficient even if the change of parameter is executed owing to a parameter to be changed and the extent thereof. At this time, the first cyclic coefficient and the third cyclic coefficient have the same value.

The second cyclic coefficient is set according to which parameter to be changed and to which extent the parameter is changed. In other words, the second cyclic coefficient is set according to a changed pattern of a parameter. The number of parameters changed at a given time is not limited to one. A plurality of parameters also may be changed simultaneously. FIG. 4A illustrates a data table of the second cyclic coefficients corresponding to a state of setting parameters before the change and a state of setting parameters after the change, which is used in the present exemplary embodiment. System control unit 104 uses the setting parameter of the data table.

There are significantly many types of states of setting parameters. However, in order to simplify description, the present exemplary embodiment will be described in four states of setting from $M_1$ to $M_4$. As illustrated in the table in FIG. 4A, when changing from $M_1$ to $M_4$ to $M_1$ to $M_4$, the second cyclic coefficient is determined in advance respectively. For example, when a mode is changed from $M_1$ to $M_2$, the second cyclic coefficient is provided by $K_{12}$.

The second cyclic coefficient is set from two points of view, which are roughly divided. One point of view is to set the second cyclic coefficient to a small value to reduce an influence on a pixel before a cycle, and hardly see tailing. In this case, an image is relatively swiftly be switched.

Another point of view is to increase the second cyclic coefficient to reduce a rapid change in signal. In either point of view, the second cyclic coefficient basically is set to prevent an uncomfortable image from being generated as much as possible when a parameter is changed. The second cyclic coefficient is different in purpose from the first and the third cyclic coefficients, which are cyclic coefficients suitable for image capture in a state of setting each parameter.

The present exemplary embodiments is characterized in that the second cyclic coefficient for preventing an uncomfortable image in changing a parameter is set between the first cyclic coefficient and the third cyclic coefficient each suitable for image capture in a state of setting parameters.

For example, it is considered that a change of parameter from $M_1$ to $M_2$ changes a setting of white balance, thereby changing a color.

At this time, in consideration that an image when a parameter is changed is recorded, in order that a tint is rapidly changed and an unnatural moving image is not provided, a large value compared with a case in which a color is not changed, for example, a value close to 1 is set to $K_{12}$. This allows a change of parameter to be gradually applied to an output signal of the NR unit 109 compared with a case in which a color is not changed. Thus, an image, which color is gradually changed, can be obtained.

On the other hand, when the image is intended to be swiftly changed to a desired color after the change, a small value compared with a case in which a color is not changed, for example, a value close to zero is set to $K_{12}$. This causes a change of parameter to be swiftly applied to an output signal of the NR unit 109 compared with a case in which a color is not changed. Thus, an image, which is swiftly changed to a desired color after the change, is obtained.

Similarly, it is considered that a parameter is changed from M3 to M4 so that an angle of view is changed toward a telephoto-end rapidly.

When an angle of view is changed, if the previous image is referred, an unnatural image may frequently be provided. Thus, a small value compared with a case in which an angle of view is not changed, for example, a value close to zero is set to $K_{12}$. This causes a change of parameter to be swiftly applied to an output signal of the NR unit 109 compared with a case in which an angle of view is not changed. Thus, a suitable image, which swiftly follows the change of angle of view, is obtained.

On the other hand, for example, when an angle of view is slowly changed, an image may frequently be intended to be smoothly changed. Thus, a large value compared with a case in which an angle of view is not changed, for example, a value close to 1 is set to $K_{12}$. This causes a change of parameter to be gradually applied to an output signal of the NR unit 109 compared with a case in which an angle of view is not changed. Thus, a suitable image, which smoothly follows the change in angle of view, is obtained.

In the above description, as examples, changes of parameters including changes of color and angle of view are described. However, the present exemplary embodiment is not limited to this. The present exemplary embodiment can be applied to all changes of parameters concerning the imaging unit and the processing unit.

Further, as the method for setting the second cyclic coefficient, an example, in which only a change in color or angle of view is considered, has been illustrated. However, the present exemplary embodiment is not limited to this. The second cyclic coefficient may be set including a change of a plurality of parameters such that, for example, a color and an angle of view are changed together. In this case, for example, based on a difference in extent between the change in color and the change in angle of view, in consideration of giving priority to a size of the change in color, a setting will be executed.

There may be two main types of settings. One is to set a cyclic coefficient to a relatively large value in order to smooth a connection between before and after the change of parameter. Another is to set a cyclic coefficient to a relatively small value in order to thin a connection between before and after the change of parameter to swiftly change an image.

A use environment and a request of a user that is to be reflected on a setting of the second cyclic coefficient may be intended in advance in the stage of production or considered when a table is produced. The user also may change a setting according to the use environment and the request of the user.

Further, as illustrated in FIG. 2B, when an output signal of the NR unit 109 is changed from $S_1$ to $S_2$, the time it takes for the output signal to converge on $S_2$ is different according to a cyclic coefficient. Thus, in order to sufficiently demonstrate the above-described effect by the second cyclic coefficient, it is desirable to change a frame number (hereinafter, $F_{23}$) until a cyclic coefficient is changed from the second cyclic coefficient to the third cyclic coefficient according to the second cyclic coefficient.

FIG. 4B illustrates one example data table of a frame number according to the second cyclic coefficient. This table is obtained by calculating the frame number by which output of the NR unit becomes 98% of $S_2$. In the present exemplary embodiment, after the frame number illustrated in FIG. 4B is obtained, a cyclic coefficient is changed from the second cyclic coefficient to the third cyclic coefficient. In other words, during a period of obtaining a signal of the frame number that is determined in FIG. 4B according to the second cyclic coefficient determined in FIG. 4A, the second cyclic coefficient is maintained, and then a cyclic coefficient is changed from the second cyclic coefficient to the third cyclic coefficient.

As described above, in the present exemplary embodiment, a cyclic coefficient for an image in changing a parameter is separately set from a cyclic coefficient to be set with each parameter set when a parameter is changed. Thus, generation of an image, which causes discomfort when a parameter is changed, can be prevented.

Further, a period to be cycled with a value of acyclic coefficient when changing a parameter is changed according to a cyclic coefficient in changing a parameter. Thus, a signal is converged in a cyclic period with a value of a cyclic coefficient when changing a parameter, and then a cyclic coefficient can be changed.

In the present exemplary embodiment, in a recording mode, the processing is changed according to whether a change of parameter is executed particularly in process of recording a moving image. Further, the processing is changed according to whether a pre-REC (record) mode is used, which allows recording from an image that is a predetermined time prior to the timing when a user starts recording.

The present exemplary embodiment basically is directed to preventing an uncomfortable image from being generated in a moving image to be recorded by executing confirmation of the above-described two states. Further, on the contrary, the present exemplary embodiment is directed to swiftly reflecting a change of parameter to be performed by a user on an image when the image is not recorded. A schematic block diagram in the present exemplary embodiment is similar to that illustrated in FIG. 1. Thus, the description thereof is omitted.

Figure 5:
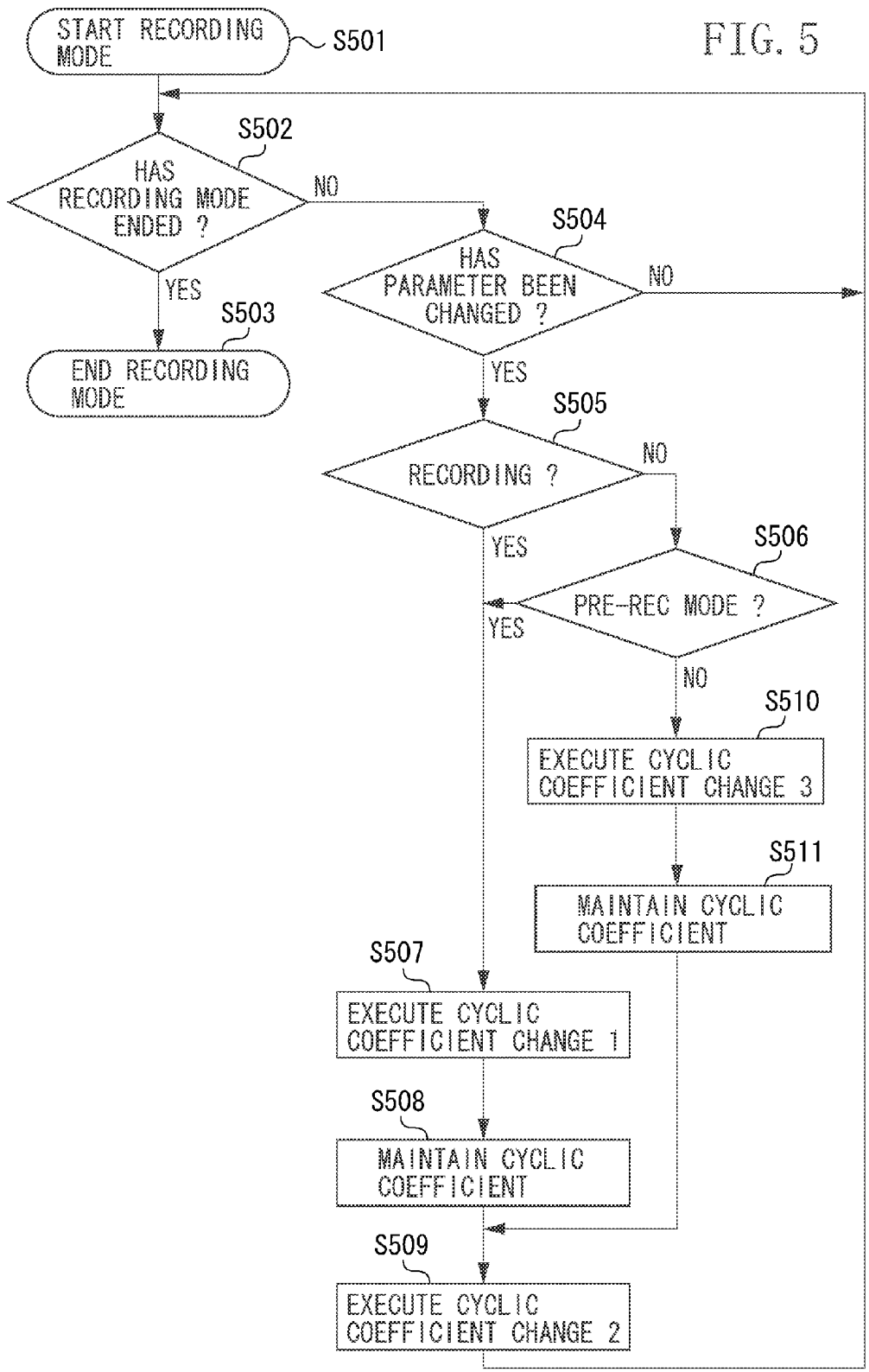
FIG. 5 is a flowchart illustrating a change of cyclic coefficient according to a second exemplary embodiment.

FIG. 5 illustrates a flowchart concerning a change of cyclic coefficient according to the present exemplary embodiment. In step S501, when a power source is started up or a recording mode is changed, the processing is started. Next, in step S502, it is determined whether the recording mode ends. If the power source is turned off or the recording mode is changed to a playback mode (YES in step S502), in step S503, the recording mode ends.

In step S504, in the recording mode, further, it is determined whether a change of parameter is instructed by the operation of a user. When it is determined that the change of parameter has been executed (YES in step S504), subsequently, in step S505, it is determined whether recording is being performed. When it is determined that recording is not being performed (NO in step S505), in step S506, further, it is determined whether the pre-REC wait state is set.

The pre-REC mode is a wait state in which a moving image is continuously recorded, for example, from before several seconds temporarily, and when a recording start button is pressed, a moving image including data that is temporarily recorded can be stored when the recording start button is pressed.

In a case in which a parameter is changed in this pre-REC mode, when recording is started within several seconds during which recording by the pre-REC is being performed, a change in image when a parameter is changed is recorded. Thus, as described above, an image causing discomfort may be recorded. Accordingly, in the pre-REC mode, the second cyclic coefficient, which is similar to that when recording is performed, is set.

Further, in the present exemplary embodiment, when recording is not performed and the imaging apparatus is not in the pre-REC mode while the imaging apparatus is in the recording mode, a cyclic coefficient is changed from the first cyclic coefficient to a fourth cyclic coefficient that is close to zero to independently establish pixel information before and after the change of parameter.

At this time, a value of $F_{43}$, which is the frame number for maintaining the fourth cyclic coefficient, is small, and thus a cyclic coefficient is immediately changed to the third cyclic coefficient. This assumes a state in which a user is studying a setting of various parameters in a live view, and allows an effect on a video caused by a change of various modes to be swiftly confirmed.

When the imaging apparatus is performing recording (YES in step S505) or in the pre-REC mode (YES in step S506), then in step S507, a cyclic coefficient is changed from the first cyclic coefficient to the second cyclic coefficient (cyclic coefficient change 1). The second cyclic coefficient is selected according to modes before and after the change from the table in FIG. 4A illustrated in the first exemplary embodiment.

Next, according to the table in FIG. 4B illustrated in the first exemplary embodiment, during a period until a signal of the frame number corresponding to the selected second cyclic coefficient is obtained, the second cyclic coefficient is maintained. In step S508, when the period ends, in step S509, a cyclic coefficient is changed to the third cyclic coefficient (cyclic coefficient change 2).

When the imaging apparatus in not in the pre-REC mode (NO in step S506), in step S510, a cyclic coefficient is changed from the first cyclic coefficient to the fourth cyclic coefficient (cyclic coefficient change 3). As described above, the fourth cyclic coefficient is a value close to zero to independently establish pixel information before and after the change of mode.

Next, in step S511, during a period until the frame number becomes $F_{43}$, the fourth cyclic coefficient is maintained (maintaining of cyclic coefficient). In step S509, when the period ends, a cyclic coefficient is changed to the third cyclic coefficient (cyclic coefficient change 2).

When an instruction to change a parameter is not given (NO in step S504) or a change of cyclic coefficient ends in step S509, the processing returns to determination in step S502.

As described above, in the present exemplary embodiment, when a moving image may be recorded, a cyclic coefficient used when changing a parameter is separately set from a cyclic coefficient to be set with each parameter set when a parameter is changed. This allows an image that causes discomfort to be prevented from being recorded when a parameter is changed.

Simultaneously, on the other hand, when a user intends to confirm an effect on a video caused by a change of parameter in a live view, the user can swiftly switch images from an image before the change of parameter to an image after the change thereof to display the image.

Further, a period of being cycled in a value of a cyclic coefficient in changing a parameter is changed according to a cyclic coefficient when a parameter is changed. Thus, a signal is converged during the cyclic period with a value of a cyclic coefficient in changing a parameter, and then the cyclic coefficient can be changed.

In the present exemplary embodiment, the imaging apparatus includes a video camera as one of examples. However, the imaging apparatus is not limited to this. The present exemplary embodiment can be applied to various apparatuses, which can perform preview display or recording of a moving image that uses the cyclic noise reduction. For example, a network camera such as a monitoring camera to be used for monitoring, a digital camera having a moving image function, and the like may be employed.

Aspects of the present invention also can be realized by a computer of a system or apparatus (or devices such as a central processing unit (CPU) or microprocessor unit (MPU)) that reads out and executes a program recorded on a memory device to perform the functions of the above-described embodiments. The central processing unit may include at least one of an imaging unit, a processing unit, a parameter change unit, and a coefficient change unit, for example. Aspects of the present invention also can be realized by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-157025 filed Jul. 1, 2009, which is hereby incorporated by reference herein in its entirety.

What is claimed is:

1. An imaging apparatus, comprising:
an imaging unit configured to capture an object image to output an image signal of the captured object image;
a processing unit configured to perform a signal processing on the image signal, wherein the processing unit includes a cyclic noise reduction unit configured to reduce a noise of the image signal;
a parameter change unit configured to change a parameter concerning at least one of an imaging by the imaging unit and the signal processing by the processing unit; and
a coefficient change unit configured to change a cyclic coefficient of the cyclic noise reduction unit,
wherein, when the parameter change unit changes the parameter, the coefficient change unit changes the cyclic coefficient from a first cyclic coefficient to a second cyclic coefficient, wherein the first cyclic coefficient corresponds to a state before the change of the parameter and the second cyclic coefficient corresponds to a change pattern of the parameter changed by the parameter change unit, and changes the cyclic coefficient from the second cyclic coefficient to a third cyclic coefficient that corresponds to a state after the change of the parameter.

2. The imaging apparatus according to claim 1, wherein the coefficient change unit is configured to set a predetermined time interval to change the cyclic coefficient from the second cyclic coefficient to the third cyclic coefficient according to a change pattern of the parameter.

3. The imaging apparatus according to claim 1, wherein the parameter change unit is configured to change a parameter when one of an object to be captured by the imaging unit is changed and a composition to the object is changed.

4. The imaging apparatus according to claim 1, further comprising an instruction unit configured to instruct the parameter change unit to change a parameter,
wherein the instruction unit instructs the parameter change unit via an operation by a user.

5. The imaging apparatus according to claim 1, wherein, when a change pattern of the parameter includes a change in color, the coefficient change unit is configured to set the second cyclic coefficient to a value that causes a change of parameter to be applied to an output signal of the cyclic noise reduction unit at a rate that is faster than when applied to an output signal of the cyclic noise reduction unit under circumstances where the change pattern of the parameter does not include a change in color.

6. The imaging apparatus according to claim 1, wherein, when a change pattern of the parameter includes a change in color, the coefficient change unit is configured to set the second cyclic coefficient to a value that causes a change of parameter to be applied to an output signal of the cyclic noise reduction unit at a rate that is slower than when applied to an output signal of the cyclic noise reduction unit under circumstances where the change pattern of the parameter does not include a change in color.

7. The imaging apparatus according to claim 1, wherein, when a changed pattern of the parameter includes a change in angle of view, the coefficient change unit is configured to set the second cyclic coefficient to a value that causes a change of parameter to be applied to an output signal of the cyclic noise reduction unit at a rate that is slower than when applied to an output signal of the cyclic noise reduction unit under circumstances where the change pattern of the parameter does not include a change in angle of view.

8. The imaging apparatus according to claim 1, wherein, when a changed pattern of the parameter includes a change in angle of view, the coefficient change unit is configured to set the second cyclic coefficient to a value that causes a change of parameter to be applied to an output signal of the cyclic noise reduction unit at a rate that is faster than when applied to an output signal of the cyclic noise reduction unit under circumstances where the changed pattern of the parameter does not include a change in angle of view.

9. The imaging apparatus according to claim 1, wherein the processing unit includes a display processing unit configured both to convert the image signal into a signal for displaying on a display unit, and to output the converted image signal to the display unit.

10. The imaging apparatus according to claim 1, wherein the processing unit includes a recording processing unit configured both to convert the image signal into a signal for recording on a recording unit, and to output the converted image signal to the recording unit, and wherein, when a moving image is not recorded on the recording unit by the recording processing unit, the cyclic coefficient change unit is configured to set the second cyclic coefficient to a value that causes a change of parameter to be applied to an output signal of the cyclic noise reduction unit at a rate that is faster than when applied to an output signal of the cyclic noise reduction unit under circumstances where a moving image is recorded.

11. The imaging apparatus according to claim 10, further comprising a recording instruction unit configured to instruct the recording processing unit to perform recording on the recording unit, wherein the recording processing unit includes a pre-REC mode that is configured to start recording at a predetermined time, wherein the predetermined time begins before the recording instruction unit has instructed recording, and wherein, when the recording processing unit is not in the pre-REC mode, the cyclic coefficient change unit is configured to set the second cyclic coefficient to a value that causes a change of parameter to be applied to an output signal of the cyclic noise reduction unit at a rate that is faster than when applied to an output signal of the cyclic noise reduction unit under circumstances where the recording processing unit is in a pre-REC mode.

12. The imaging apparatus according to claim 1, wherein parameters concerning imaging by the imaging unit include one of parameters of arrangement of an optical system.

13. The imaging apparatus according to claim 1, wherein parameters concerning the signal processing by the processing unit include one of a gain value of a white balance, parameters in a setting suitable for capturing scenery, and parameters in a setting for capturing a person.

14. The imaging apparatus according to claim 1, wherein the change pattern of the parameter includes that a function of pixel addition or a function of frame addition is applied changing from a normal image capture condition.

15. A control method for an imaging apparatus, wherein the imaging apparatus includes an imaging unit configured both to capture an object image to output an image signal of the captured object image, and a processing unit configured to perform a signal processing on the image signal, the control method comprising:

executing a reduction in noise using a cyclic noise reduction unit configured to reduce a noise of a signal output by the processing unit;

changing a parameter concerning at least one of an imaging by the imaging unit and the signal processing by the processing unit; and changing a cyclic coefficient of the cyclic noise reduction unit, wherein, when the parameter is changed, a coefficient change unit changes the cyclic coefficient from a first cyclic coefficient to a second cyclic coefficient, wherein the first cyclic coefficient corresponds to a state before the change of the parameter and the second cyclic coefficient corresponds to a change pattern of the parameter changed by the parameter change unit, and changes the cyclic coefficient from the second cyclic coefficient to a third cyclic coefficient that corresponds to a state after the change of the parameter.

16. A non-transitory computer-readable storage medium storing a computer-executable program that causes an imaging apparatus to perform a control method according to claim 12.

* * * * *